United States Patent
Camilo-Martinez et al.

(10) Patent No.: US 9,188,179 B2
(45) Date of Patent: Nov. 17, 2015

(54) BRAKE PAD FOR A DISC BRAKE

(71) Applicant: KNORR-BREMSE Systeme Fuer Nutzfahrzeuge GmbH, Munich (DE)

(72) Inventors: Jose Camilo-Martinez, Unterhaching (DE); Johann Baumgartner, Moosburg (DE); Wolfgang Pahle, Bad Wiessee (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 80 days.

(21) Appl. No.: 13/871,650

(22) Filed: Apr. 26, 2013

(65) Prior Publication Data

US 2013/0240311 A1  Sep. 19, 2013

Related U.S. Application Data

(63) Continuation of application No. PCT/EP2011/068748, filed on Oct. 26, 2011.

(30) Foreign Application Priority Data

Oct. 29, 2010  (DE) .......................... 10 2010 050 103

(51) Int. Cl.
*F16D 65/092*  (2006.01)
(52) U.S. Cl.
CPC .................... *F16D 65/092* (2013.01)
(58) Field of Classification Search
CPC ................................................ F16D 2065/026
USPC ....................... 188/73.1, 250 R, 250 H, 250 B
See application file for complete search history.

(56) References Cited

U.S. PATENT DOCUMENTS

| | | | | |
|---|---|---|---|---|
| 5,236,068 A | * | 8/1993 | Nagai et al. | 188/71.7 |
| 6,135,244 A | * | 10/2000 | Le Bris | 188/250 B |
| 6,283,256 B1 | | 9/2001 | Dahlheimer et al. | |
| 6,374,959 B1 | * | 4/2002 | Kay | 188/250 B |
| 6,634,470 B2 | * | 10/2003 | Emmet et al. | 188/250 B |

(Continued)

FOREIGN PATENT DOCUMENTS

| | | |
|---|---|---|
| CN | 1232529 A | 10/1999 |
| CN | 1704623 A | 12/2005 |
| DE | 10 2005 052 435 A1 | 5/2007 |

(Continued)

OTHER PUBLICATIONS

German Office Action dated Sep. 5, 2011 including partial English-language translation (Ten (10) pages).

(Continued)

*Primary Examiner* — Thomas J Williams
(74) *Attorney, Agent, or Firm* — Crowell & Moring LLP

(57) ABSTRACT

A brake pad for a disc brake, which can be installed into a wheel that has a size of 22.5", includes a ring segment-shaped pad support plate which supports a friction lining material, an inner radius Ri of which merges with straight bearing surfaces on both sides, and which has two molded-on pressure pieces that are arranged in a mutually spaced manner on the pad support plate rear face that faces away from the friction lining material. The brake pad is designed such that the length of the pad support plate is 245-250 mm, the inner radius is 115-135 mm, and the outer radius of the pad support plate is 205-220 mm.

25 Claims, 1 Drawing Sheet

| Feature | 22.5" [mm] | 19.5"[mm] |
|---|---|---|
| L | 245 - 250 | 205 - 220 |
| Ra | 205 - 220 | 185 - 200 |
| Ri | 115 - 135 | 100 - 125 |
| D | 55 - 70 | 55 - 70 |

(56) References Cited

U.S. PATENT DOCUMENTS

| | | | |
|---|---|---|---|
| 7,258,210 B2 * | 8/2007 | Gripemark | 188/250 R |
| 2004/0168868 A1 | 9/2004 | Thomas | |

FOREIGN PATENT DOCUMENTS

| | | |
|---|---|---|
| DE | 10 2008 003 528 A1 | 7/2009 |
| JP | 54-118988 U | 8/1979 |
| JP | 58-148332 U | 10/1983 |
| JP | 2009-24797 A | 2/2009 |
| WO | WO 98/55778 A1 | 12/1998 |
| WO | WO 2009/014022 A1 | 1/2009 |

OTHER PUBLICATIONS

International Search Report dated Jan. 11, 2012 (two (2) pages).
International Preliminary Report on Patentability (PCT/IB/373) and Written Opinion (PCT/ISA/237) dated Apr. 30, 2013 (Seven (7) pages).
Chinese Office Action dated Jan. 12, 2015 (Six (6) pages).
Chinese Office Action dated Jul. 28, 2015 with English-language translation (seven (7) pages).

* cited by examiner

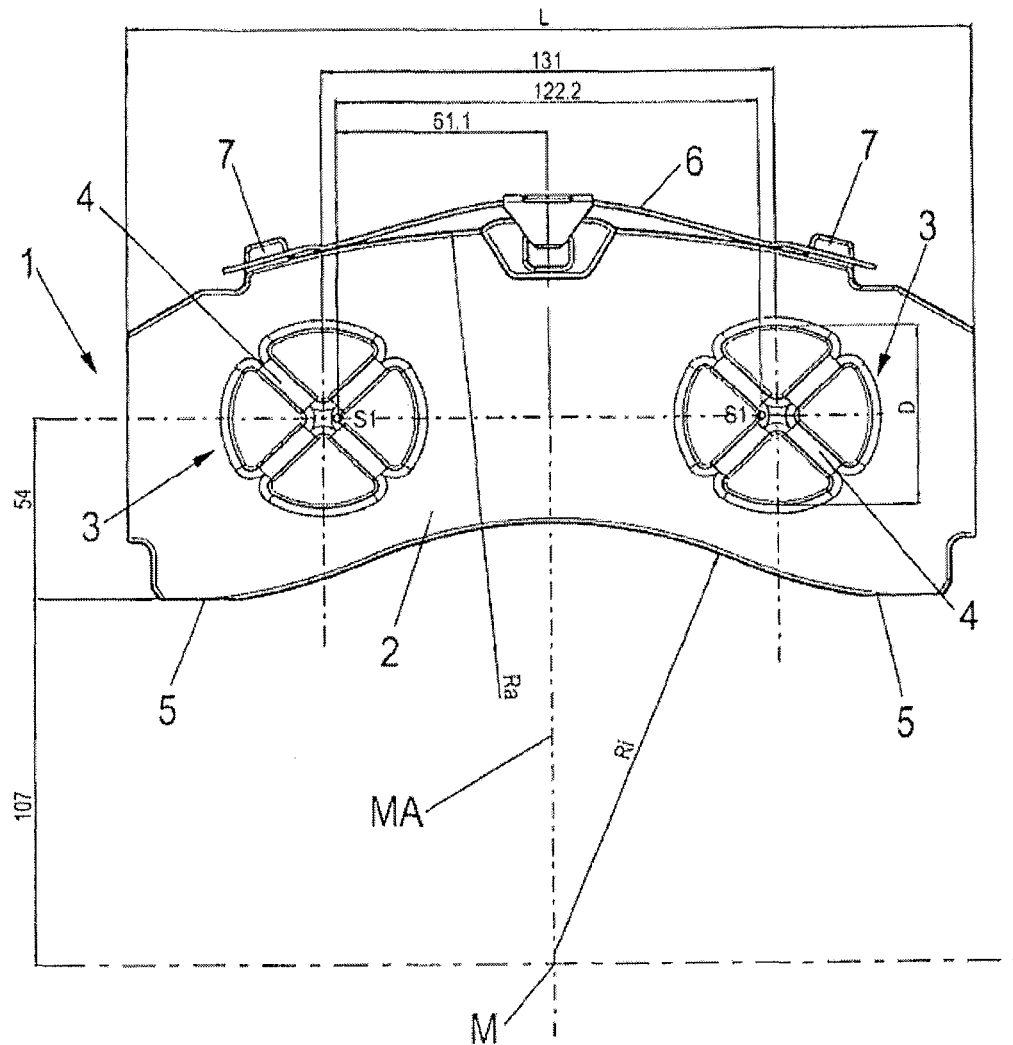
| Feature | 22.5" [mm] | 19.5"[mm] |
| --- | --- | --- |
| L | 245 - 250 | 205 - 220 |
| Ra | 205 - 220 | 185 - 200 |
| Ri | 115 - 135 | 100 - 125 |
| D | 55 - 70 | 55 - 70 |

BRAKE PAD FOR A DISC BRAKE

CROSS REFERENCE TO RELATED APPLICATIONS

This application is a continuation of PCT International Application No. PCT/EP2011/068748, filed Oct. 26, 2011, which claims priority under 35 U.S.C. §119 from German Patent Application No. DE 2010 050 103.4, filed Oct. 29, 2010, the entire disclosures of which are herein expressly incorporated by reference.

BACKGROUND AND SUMMARY OF THE INVENTION

The invention relates to a brake pad for a disc brake, in particular for a commercial vehicle disc brake which can be installed in 19.5" and 22.5" wheels.

Disc brakes fitted with such brake pads are used mainly in commercial vehicles, wherein the brake wear during long-distance operation occurs primarily by way of frequent adaptive braking which, admittedly, is carried out at relatively high traveling speeds but with low to average brake pressures. Rarely occurring emergency braking with high braking forces has only a very insignificant influence upon the overall wear of the brake.

The force initiation upon the brake pad is carried out via the pressure pistons (tappets) which, according to the conventional designs, bear against pressure pieces which are molded on the lining support plate.

In this case, the position of the pressure pieces or of the pressure pistons is predetermined by the construction-related circumstances and the installation conditions.

As a result of a non-optimum positioning of the force initiation zones, an unfavorable pressure distribution arises in the lining friction surface and cannot be adequately compensated either by additional pressure plates or by particularly thick-walled pad support plates. A particularly disadvantage consequence of this, on the one hand, is a relatively high weight, which contrasts with a continuous demand for weight optimization and, on the other hand, is an uneven wear of the brake pad and brake disc. Naturally, the service life of the disc brake is shortened as a result, which leads to increased operating costs.

The invention is therefore based on the object of further developing a brake pad so that its service life is improved.

This and other objects are achieved by a brake pad for a disc brake which can be installed in a wheel with a size of 19.5", with a ring segment-like pad support plate carrying a friction lining material the inner radius of which merges on both sides into straight bearing surfaces and which on its rear side facing away from the friction lining material has two molded-on pressure pieces which are arranged at a distance from each other. The length of the pad support plate is between 205 and 220 mm, the inner radius is between 100 and 125 mm, and the outer radius is between 185 and 200 mm.

As a result of the dimensional specifications both of the positioning of the pressure pieces and of the lengths and radii dimensions of the pad support plate, equal wear conditions are created over the entire friction lining surface, and also a weight minimization of the pad support plate is achieved with the best possible pressure distribution at the same time.

For determining the specifications according to the invention, the two brake lining halves, which are formed mirror-symmetrically transversely to the circumferential extent of the ring segment-like pad support plate, are considered separately.

In this case, the area centroid, which in a further consideration represents the reference point for the fixing of the pressure piece, is determined in each case. A force initiation directly in the area centroid, with ideal rigidity of the pad support plate, would create a homogeneous pressure distribution in the friction surface.

However, the lining wear is predetermined in a first approximation by the converted braking energy. If the different regions of the friction surface are considered from this point of view, then it shows that the radially outer surface regions, at the higher running speed which exists there, with the same surface pressure in the lining friction surface, have a higher energy density than the radially inner regions of the friction surface.

This knowledge leads to the fact that for achieving a uniform wear behavior, the surface pressure should not be constant over the entire lining friction surface but the energy density, i.e. the specific braking power ($N_{spez}$), formed from the product of surface pressure (p)·friction coefficient (μ)·running speed (v), should be constant, wherein the aim is for the braking power ($N_{spez}$) to be constant.

This relationship is influenced by the fact that the lining friction coefficient likewise experiences changes influenced by pressure, running speed and temperature. Since the overall wear is decisively determined by adaptive braking, as was described above, during which the changes induced by pressure and temperature are still small, the additional consideration of these influencing variables can be dispensed with.

The influence of different running speeds, however, is distinctly present. In the case of the relatively small braking forces of a typical adaptive braking with about 1.5 bar brake pressure, pressures over the friction surface of between 150 and 200 N/cm² are achieved. Under these conditions and with a ratio of the running speed on the outer friction ring diameter to that on the inner friction ring diameter of 1.6, the ratio of the friction coefficient on the outer friction ring diameter to that on the inner friction ring diameter is about 0.8, i.e. with homogenous pressure distribution, the generated friction power on the outer diameter of the friction strip is 1.6×0.8=1.28 higher than on the inner friction ring diameter. The factor of 1.28 is therefore to be compensated by varied pressure distribution.

This occurs by the force initiation position of the pressure pistons, therefore of the pressure pieces, in relation to the position determined for uniform pressure distribution on the connecting line of the area centroids of the lining halves, being displaced radially towards the axial center by an amount which is to be correspondingly fixed. The value of this amount is dependent upon the dimensions of the brake disc and brake pad and also upon the shape of the brake pad. For a brake for 22.5" rim size, the dimension is between 1 mm and 6 mm. In field trials, values of about 3 mm have proved to be especially suitable.

Another factor which influences the pressure distribution and therefore the energy density over the friction surface is the elasticity of the pad support plate, which is to distribute the force initiated by the pressure pistons into a uniform surface pressure.

Since the pad support plate yields under the surface pressure of the lining in the regions which are at a distance from the force initiation zones, a curvature is created and assumes maximum values in the lining center and on the tangentially oriented ends of the brake pad. Beneath the more sharply curved zones of the pad support plate, a lower surface pressure inevitably prevails since the friction lining mass which is compressed under the pressure partially expands.

This curvature has been minimized up to now by means of correspondingly stably dimensioned and therefore also correspondingly largely dimensioned pad support plates or additional pressure plates.

One possibility for achieving a smallest possible deflection of the pad support plate yet with low weight exists in an optimum positioning of the pressure pieces in the tangential direction. A minimum deflection is specifically achieved if the force initiation position is selected on a connecting line according to the condition $N_{spez}$, (braking power)=surface pressure (p)·friction coefficient (μ)·running speed (v)=constantly fixed force initiation positions, so that the deflection in the lining center and at the tangential ends of the lining is of equal value. Trials carried out on a disc brake for 22.5" wheels showed that an arrangement of the force initiation positions at the area centroid of the lining halves displaced tangentially outward by between 3 and 15 mm gives the best possible pressure distribution.

The pressure pieces, which are molded onto the pad support plate, are of a disc-like or ring-like design and conduct heat from the brake pad into the components of the brake application device. Since, as a result of this, an undesirable loading of the corresponding components occurs, the contact surface between the respective pressure piston and the bearing surface of the pressure piece is selected to be just large enough for no plastic deformation to occur on the pressure pistons and/or on the bearing surfaces of the pressure pieces even with maximum temperature on the brake pad in the event of full braking. Depending upon the material of the pad support plate, bearing surfaces per pressure piece of between 15 and 35 cm² have proven to be adequate. In the case of cast pad support plates, the bearing surfaces can lie in the lower range of the specified values on account of the high resistance to pressure of the cast material.

In the case of disc brakes for 22.5" wheels, the bearing surface has a diameter of 55 mm, whereas the overall thickness in the bearing region is 14 mm, with a thickness of the pad support plate of 9 mm in the adjacent surrounding region.

For establishing the operating parameters, the conditions of an adaptive braking are taken as a basis, namely a brake pressure of between 1.0 and 2.0 bar, a speed of between 60 and 90 km/h and a brake temperature of between 100 and 200° C.

Other objects, advantages and novel features of the present invention will become apparent from the following detailed description of one or more preferred embodiments when considered in conjunction with the accompanying drawings.

BRIEF DESCRIPTION OF THE DRAWINGS

The single FIGURE is a rear-side view of a brake pad according to an embodiment of the invention.

DETAILED DESCRIPTION OF THE DRAWINGS

The brake pad, which is shown in the FIGURE, is provided with the designation 1, and has a pad support plate 2, onto which are molded pressure pieces 3 against which bears a pressure piston (tappet) of a brake application device of a disc brake, in each case, during operation.

The size of the bearing surface of the pressure pieces 3 is selected for reducing the heat input into the brake application device of the brake so that with a heated up brake, i.e. with a temperature of the pad support plate 2 of >450° C., no plastic deformation occurs on the pressure pistons and/or on the pad support plate 2 in the event of full braking. The bearing surface, depending upon material selection, is between 20 and 35 cm², whereas the diameter of the circular bearing surfaces is between 50 and 70 mm, preferably between 60 and 65 mm.

The distance of the center points of the bearing surfaces from each other is between 125 and 135 mm, preferably 131 mm.

The ring segment-like pad support plate 2, which on the side opposite the pressure pieces 3 carries a friction lining material (not shown) has on its outer edge lugs 7, and is formed mirror-symmetrically to a center axis MA for the guiding of a pad retaining spring 6, wherein the radius of the outer edge is identified by Ra and the radius of the inner edge is identified by Ri.

The inner edge merges on both sides toward the outside into bearing surfaces 5, by means of which the brake pad 1 bears on a vehicle-side brake carrier, for example.

The distance of the center points of the two pressure pieces 3 from the respective bearing surfaces 5 is between 48 and 58 mm, preferably between 53 and 56 mm. The distance of the bearing surfaces 5 to the radii center point M is 107 mm.

The pressure pieces 3, compared with the thickness of the pad support plate 2, are between 1.3 and 1.8 times thicker, preferably between 1.5 and 1.6 times thicker, in the surrounding region.

For better heat dissipation from the contact region of the pressure pieces 3 with the respectively associated brake piston, provision is made for transversely extending grooves 4.

As mentioned, by fixing the force initiation positions, defined by the center of the pressure pieces 3, equal specific braking powers ($N_{spez}$=p μ v=const.) are to be achieved over the entire friction lining surface. To this end, the half-side area centroids S1 of the friction lining surface are defined.

The influence of the different running speed on the inner edge and outer edge of the brake pad necessitates a displacement of the force application points, defined by the center of the pressure pieces 3, in relation to the respective half-side area centroid in order to compensate the lower running speed in this region by means of higher surface pressure. The amount of displacement lies between 0 and 6 mm, preferably being 3 mm.

In the table beneath the figurative representation of the brake pad 1, the dimensions of the respective brake pad 1 for a 22.5" wheel and 19.5" wheel are listed, wherein L represents the length of the brake pad, i.e. of the pad support plate 2, Ra represents the outer radius and Ri the inner radius of the lining support plate 2, and D represents the diameter of the bearing surface of the pressure piece 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake pad for a disc brake installable in a 19.5" size wheel, the brake pad comprising:
    a ring segment-shaped pad support plate;
    a friction lining material carried by one side of the pad support plate, the friction lining material being mirror-symmetrical with respect to a radial center axis;
    two molded-on pressure pieces arranged on an opposite side of the pad support plate from the friction lining material, the two molded-on pressure pieces being arranged at a distance from one another;

wherein an inner radius of the ring-shaped pad support plate merges on both sides into straight bearing surfaces of the pad support plate;

wherein a length of the pad support plate is between 205 and 220 mm, the inner radius is between 100 and 125 mm, and an outer radius of the pad support plate is between 185 and 200 mm, and wherein a center of the pressure pieces lies between 1 and 6 mm radially further inward than area centroids of each half of the mirror-symmetrical friction lining material in order to achieve a constant specific braking power over the entire friction lining material when in use.

2. The brake pad according to claim 1, wherein a bearing diameter of each of the pressure pieces is between 50 and 70 mm.

3. The brake pad according to claim 2, wherein the bearing diameter is between 60 and 65 mm.

4. The brake pad according to claim 1, wherein each pressure piece has a bearing surface of between 15 and 35 cm$^2$.

5. The brake pad according to claim 1, wherein a center-to-center distance of the two pressure pieces with respect to one another are between 3 and 15 mm larger than the area centroids of each half of the mirror-symmetrical friction lining material.

6. The brake pad according to claim 1, wherein the center lies 3 mm radially further inward than the area centroids.

7. The brake pad according to claim 1, wherein a center-to-center distance between the pressure pieces is between 125 and 135 mm.

8. The brake pad according to claim 7, wherein the center-to-center distance is 131 mm.

9. The brake pad according to claim 1, wherein a center-to-center distance of the pressure pieces to the bearing surfaces is between 48 and 58 mm.

10. The brake pad according to claim 9, wherein the center-to-center distance of the pressure pieces to the bearing surfaces is between 53 and 56 mm.

11. The brake pad according to claim 1, wherein a thickness of the pressure pieces is between 1.3 and 1.8 times thicker than a thickness of the pad support plate.

12. The brake pad according to claim 11, wherein the thickness of the pressure pieces is between 1.5 and 1.6 times thicker than the thickness of the pad support plate.

13. A brake pad for a disc brake installable in a 22.5" size wheel, the brake pad comprising:

a ring segment-shaped pad support plate;

a friction lining material carried by one side of the pad support plate, the friction lining material being mirror-symmetrical with respect to a radial center axis;

two molded-on pressure pieces arranged on an opposite side of the pad support plate from the friction lining material, the two molded-on pressure pieces being arranged at a distance from one another;

wherein an inner radius of the ring-shaped pad support plate merges on both sides into straight bearing surfaces of the pad support plate;

wherein a length of the pad support plate is between 245 and 250 mm, the inner radius is between 115 and 135 mm, and an outer radius of the pad support plate is between 205 and 220 mm, and wherein a center of the pressure pieces lies between 1 and 6 mm radially further inward than the area centroids of each half of the mirror-symmetrical friction lining material in order to achieve a constant specific braking power over the entire friction lining material when in use.

14. The brake pad according to claim 13, wherein the center lies 3 mm radially further inward than the area centroids.

15. The brake pad according to claim 13, wherein a bearing diameter of each of the pressure pieces is between 50 and 70 mm.

16. The brake pad according to claim 15, wherein the bearing diameter is between 60 and 65 mm.

17. The brake pad according to claim 13, wherein each pressure piece has a bearing surface of between 15 and 35 cm$^2$.

18. The brake pad according to claim 13, wherein an overall thickness of the pad support plate in a region of the pressure pieces is 14 mm and a thickness of the pad support plate outside the pressure pieces is 9 mm.

19. The brake pad according to claim 13, wherein a center-to-center distance of the two pressure pieces with respect to one another are between 3 and 15 mm larger than the area centroids of each half of the mirror-symmetrical friction lining material.

20. The brake pad according to claim 13, wherein a center-to-center distance between the pressure pieces is between 125 and 135 mm.

21. The brake pad according to claim 20, wherein the center-to-center distance is 131 mm.

22. The brake pad according to claim 13, wherein a center-to-center distance of the pressure pieces to the bearing surfaces is between 48 and 58 mm.

23. The brake pad according to claim 22, wherein the center-to-center distance of the pressure pieces to the bearing surfaces is between 53 and 56 mm.

24. The brake pad according to claim 13, wherein a thickness of the pressure pieces is between 1.3 and 1.8 times thicker than a thickness of the pad support plate.

25. The brake pad according to claim 24, wherein the thickness of the pressure pieces is between 1.5 and 1.6 times thicker than the thickness of the pad support plate.

* * * * *